United States Patent
Brunson et al.

(10) Patent No.: US 8,069,761 B2
(45) Date of Patent: Dec. 6, 2011

(54) DUST COLLECTOR

(75) Inventors: Mark E. Brunson, Bel Air, MD (US);
Frederick R. Bean, Finksburg, MD (US); Craig A. Oktavec, Forest Hill, MD (US); Daryl S. Meredith, York, PA (US); Thomas R. Kaye, Jr., Bel Air, MD (US); James R. Parks, San Martino in Colle (IT); Lee M. Brendel, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 1242 days.

(21) Appl. No.: 11/387,179

(22) Filed: Mar. 23, 2006

(65) Prior Publication Data

US 2006/0230898 A1    Oct. 19, 2006

Related U.S. Application Data

(60) Provisional application No. 60/672,394, filed on Apr. 18, 2005.

(51) Int. Cl.
*B26D 7/06* (2006.01)
*B27B 27/06* (2006.01)

(52) U.S. Cl. .............. 83/100; 83/485; 83/490; 83/473; 83/471.3

(58) Field of Classification Search .............. 83/100, 83/473, 485, 471.3, 490, 581, 162
See application file for complete search history.

(56) References Cited

U.S. PATENT DOCUMENTS

| 1,618,234 | A | * | 2/1927 | Skinner ........................... 24/284 |
| 2,340,560 | A | * | 2/1944 | Rempt ....................... 174/40 CC |
| 2,372,699 | A | * | 4/1945 | Wiken et al. .................... 83/100 |
| 5,445,056 | A | * | 8/1995 | Folci .............................. 83/100 |
| 5,782,153 | A |   | 7/1998 | Sasaki et al. |
| 5,819,619 | A | * | 10/1998 | Miller et al. .................... 83/100 |
| 6,470,778 | B1 | * | 10/2002 | Kaye et al. ..................... 83/100 |
| 6,742,425 | B2 | * | 6/2004 | Oktavec et al. ................. 83/100 |
| 6,960,124 | B2 | * | 11/2005 | Lee ............................... 451/456 |
| 6,988,435 | B2 | * | 1/2006 | Kao ............................... 83/100 |
| 7,204,178 | B2 | * | 4/2007 | Bergmann ....................... 83/162 |
| 2002/0104416 | A1 |   | 8/2002 | Brickner |
| 2004/0060405 | A1 |   | 4/2004 | Kao |

(Continued)

FOREIGN PATENT DOCUMENTS

EP       0958878 A2    11/1999

(Continued)

OTHER PUBLICATIONS

J. Antoli Jover, Partial European Search Report, Jun. 7, 2006, Munich, Germany.

(Continued)

*Primary Examiner* — Boyer D Ashley
(74) *Attorney, Agent, or Firm* — Michael Aronoff; Adan Ayala

(57) ABSTRACT

A saw with a base assembly, a table pivotably attached to the base assembly, a housing pivotably attached to the table, at least one rail slidably connected to the housing, and a saw assembly disposed on the at least one rail. The saw assembly includes a motor, and a blade driven by the motor. The saw also includes a dust collector attached to the saw assembly, the dust collector having a tube that extends through the housing.

15 Claims, 2 Drawing Sheets

U.S. PATENT DOCUMENTS

2006/0185484 A1 * 8/2006 Sasaki et al. ............. 83/100

FOREIGN PATENT DOCUMENTS

| EP | 1180607 A1 | 2/2002 |
| EP | 1 266 720 A | 12/2002 |
| JP | 09 029707 A | 2/1997 |
| JP | 11 058320 A | 3/1999 |

OTHER PUBLICATIONS

Annex to the European Search Report on European Patent Application No. EP 06 11 2534.

Jordi Antoli Jover, Partial European Search Report, Sep. 12, 2007, Munich, Germany.

Annex to the European Search Report on European Patent Application No. EP07111825.

Jordi Antoli Jover, European Search Report, Jul. 15, 2008, Munich, Germany.

Annex to the European Search Report on European Patent Application No. EP08155609.

* cited by examiner

DUST COLLECTOR

CROSS-REFERENCE TO RELATED APPLICATIONS

The present application derives priority from U.S. Patent Application No. 60/672,394, filed Apr. 18, 2005.

BACKGROUND OF THE INVENTION

The present invention relates to dust collection mechanisms for use with chop saws.

Chop saws are power tools that have a saw assembly pivotally mounted to base or table. The user can then move the saw assembly downwardly in a chopping action to cut a workpiece. One type of chop saw is the sliding chop saw, which has a saw assembly slideably connected to the table so that the saw assembly can move along a horizontal direction, increasing the cutting capacity of the chop saw.

It is preferable to provide a dust collection mechanism for the sliding chop saw to collect any dust resulting from the cutting operation. Prior art solutions include disposing the dust collection mechanism on the table or base. This dust collector remains stationary on the table, even though the sliding saw assembly would move towards and away from the dust collector.

Another prior art solution proposes disposing a dust collector on the sliding saw assembly so that the dust collector remains stationary relative to the saw assembly. However, typical prior art solutions may not collect large amounts of the dust because of their location on the sliding saw assembly.

SUMMARY OF THE INVENTION

An improved dust collector is proposed for a chop saw. The saw comprises a base assembly, a table pivotably attached to the base assembly, a housing pivotably attached to the table, at least one rail slidably connected to the housing, a saw assembly disposed on the at least one rail, the saw assembly including a motor, and a blade driven by the motor, and a dust collector attached to the saw assembly, the dust collector having a tube that extends through the housing.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
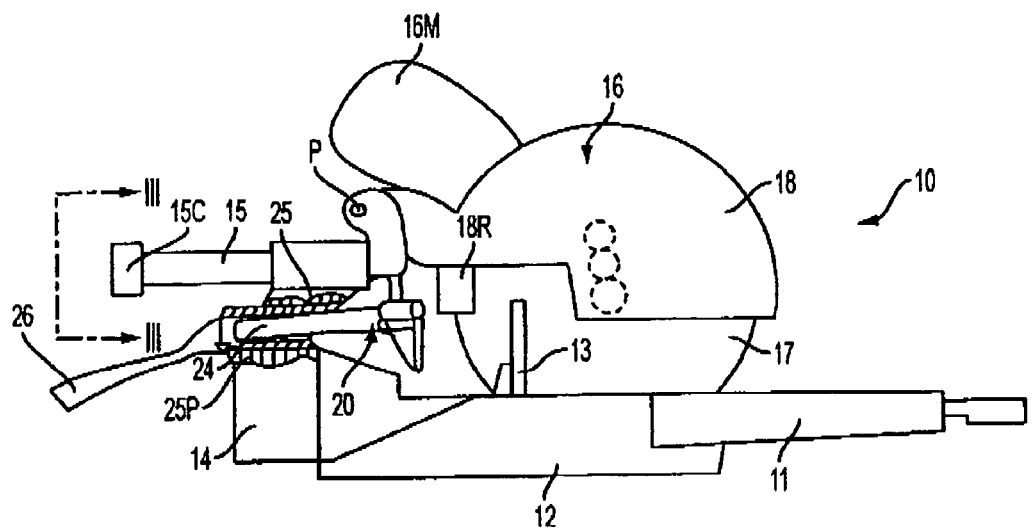
FIG. 1 illustrates a sliding chop saw including the dust collector assembly according to the present invention.

Referring to FIG. 1, chop saw 10 is shown with the dust collector assembly 20 according to the present invention. Persons skilled in the art should recognize that FIG. 1 illustrates a sliding miter saw, but they should also recognize that this invention can be implemented in any other type of chop saw and/or power tools.

Slide miter saw 10 includes a table 11 rotatably disposed on a base 12. Table 11 may have a fence 13. In addition, support arm housing 14 may be rotatably connected to table 11. Arm housing 14 may slideably receives at least one slidable rail(s) 15, which are in turn connected to saw assembly 16. The saw assembly preferably includes an upper blade guard 18, a motor 16M connected to the upper blade guard 18, and a blade 17 driven by the motor. Upper blade guard 18 may include a rear guard 18R that partially covers the rear of blade 17. Preferably, saw assembly 16 pivots about pivot P, allowing the user to move the saw assembly 16 between an upper position and a lower position to cut a workpiece disposed on base 12 and/or table 11.

Figure 2:
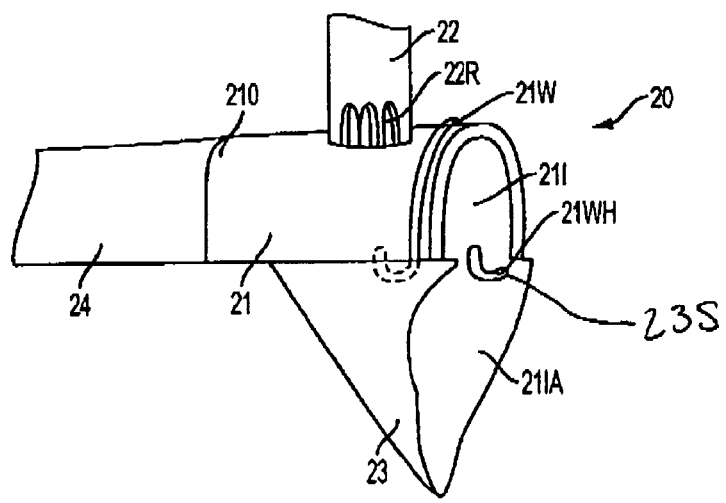
FIG. 2 illustrates the dust collection assembly of the present invention.

Referring to FIGS. 1-2, miter saw 10 may also include a dust collection assembly 20. Such dust collection assembly 20 is disclosed in U.S. Pat. No. 6,742,425, which is incorporated herein by reference. Dust collection assembly 20 may include post 22 for connecting the dust collection assembly 20 to upper blade guard 18. Post 22 may have ribs 22R for increasing the strength of the post 22. Post 22 is preferably connected to dust duct 21.

Preferably, dust duct 21 is made of ABS or XENOY plastic, or any other suitable material. Dust duct 21 may have an inlet 21I for receiving dust resulting from the cutting operation and an outlet 21O for exiting the dust.

Preferably, the cross section of inlet 21I is substantially U-shaped opening downwardly. On the other hand, the cross section of outlet 21O may be substantially circular and closed. Preferably, the diameter of outlet 21O is about 35 millimeters. Persons skilled in the art will recognize that the width of inlet 21I is preferably narrower than the width of the outlet 21O.

A dust flap 23 may be disposed underneath dust duct 21. Dust flap 23 may be made of a rubberized fabric that is resilient, such as neoprene-coated nylon. Preferably, the dust flap will be manufactured of Reevecote 18403.

Dust flap 23 may be disposed in the open portion of the inlet 21I, thus resulting in a substantially closed cross-section 21IA. The width and height of cross-section 21IA may be about 14 millimeters and about 150 millimeters, respectively.

The area of cross-section 21IA may be at least about 1.5 times the cross-sectional area of outlet 21O. Preferably, the area of cross-section 21IA is about 1.5 to about 2 times the cross-sectional area of outlet 21O. Preferably, the area of cross-section 21IA is about 1568 squared millimeters, whereas the cross-sectional area of outlet 21O is about 960.2 squared millimeters.

Persons skilled in the art will recognize that the shape of the folded dust flap 23 extending from the dust duct 21 is substantially triangular.

Persons skilled in the art should recognize that providing a dust flap 23 of resilient material, such as rubberized fabric, allows the dust flap 23 to slide along a workpiece or fold when moving past fence 13, and then substantially return to its original form.

Dust duct 21 may also have a wire 21W for holding the dust flap 23 open. Preferably, the wire 21W extends downwardly around dust duct 21, extends through dust flap 23, then hooks around the inside of dust duct 21, as shown in FIG. 2. Wire 21W may extend through a hole or slot 23S on dust flap 23. In addition, wire 21W may hook around the inside of dust duct 21 via a hook portion 21WH.

Persons skilled in the art will recognize that the wire 21W may be shaped to increase the width of cross-section 21IA. Accordingly, the area of cross-section 21IA may be at least 1.5 times (and preferably about 3 times) the cross-sectional area of outlet 21O.

Persons skilled in the art will recognize that the dust flap 23 may shut or close itself if a vacuum hose is connected to the outlet 21O which is in turn connected to a strong vacuum source. The wire 21W however may hold open dust flap 23, allowing for proper dust collection.

A tube 24 may be attached to outlet 21O. Tube 24 may extend through arm housing 14. Preferably, arm housing 14 has a channel 25. Tube 24 may extend through channel 25. Channel 25 is preferably formed by a piece 25P disposed within housing 14. Piece 25P may be made of plastic. Persons skilled in the art should recognize that a dust collection bag and/or hose 26 (which may be connected to a vacuum source) can be connected to the piece 25P.

Preferably, tube 24 telescopes within piece 25P. Such arrangement will provide for a relatively stationary hose 26, as the hose 26 is not directly connected to outlet 21O.

Persons skilled in the art should recognize that tube 24 and/or piece 25P may be shaped to increase the air velocity entering tube 24, thus creating a venturi effect and moving the dust into a dust collection bag, if hose 26 is not connected to piece 25P.

Figure 3:
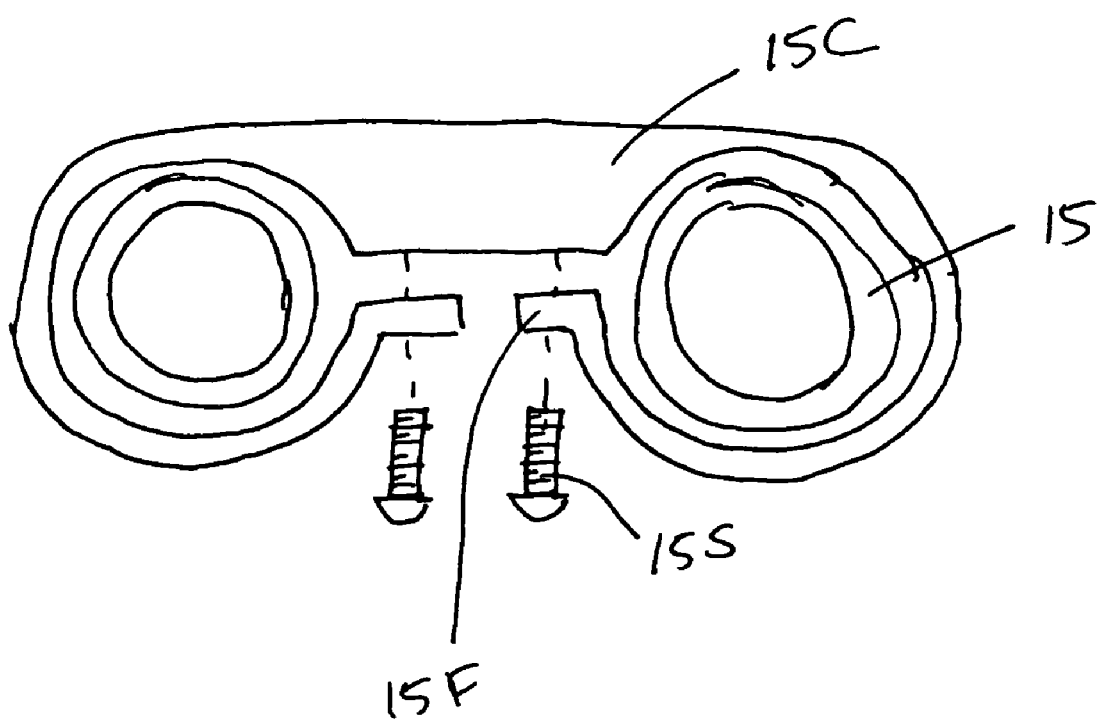
FIG. 3 shows a rail end cap along lines III-III of FIG. 1.

Referring to FIGS. 1 and 3, the saw 10 may have two or more rails 15. It is preferable to provide a connector 15C on the rails 15 to maintain the distance therebetween relatively consistent. Connector 15C preferably has a flange 15F surrounding a rail 15. A screw 15S can extend through flange 15F and threadingly engage connector 15C to clamp rail 15. Persons skilled in the art will recognize that connector 15C preferably has enough flanges 15F to surround each rail 15.

Persons skilled in the art will recognize that connector 15C may be disposed at the ends of rails 15, or on any position along rails 15.

Persons skilled in the art may recognize other alternatives to the means disclosed herein. However, all these additions and/or alterations are considered to be equivalents of the present invention.

What is claimed is:

1. A saw comprising:
    a base assembly;
    a table pivotably attached to the base assembly;
    a housing pivotably attached to the table, a channel being disposed within the housing, at least one of a dust collection bag and a hose being connectable to the housing;
    a first rail slidably connected to the housing;
    a saw assembly disposed on the first rail, the saw assembly including a motor, and a blade driven by the motor; and
    a dust collector attached to the saw assembly, the dust collector having a tube that extends into the channel and through the housing.

2. The saw of claim 1, wherein the saw assembly pivots about a first axis, and the dust collector extends through the housing at a point lower than the first axis.

3. The saw of claim 1, wherein the saw assembly further comprises a blade guard covering at least partly the blade.

4. The saw of claim 1, wherein the dust collector comprises an upper duct having a bottom portion defining an open area, an inlet and an outlet, said inlet being in a first plane, the first plane being substantially vertical, and said open area being in a second plane, the first and second planes intersecting, and
    a flexible lower flap connected to the upper duct, the lower flap disposed partly underneath the bottom portion and substantially covering the open area, such that said flexible lower flap is resiliently deformable against an upper surface of a workpiece positioned on said workpiece support portion, wherein the lower flap and the upper duct inlet define a collector inlet which is larger than the upper duct outlet.

5. The saw of claim 4, wherein the dust collector further comprises a post attached to the upper duct for connecting the upper duct to the saw assembly.

6. The saw of claim 4, wherein the upper duck inlet has a substantially U-shaped cross-section.

7. The saw of claim 4, wherein the dust collector further comprises a wire for maintaining the lower flap in an open position.

8. The saw of claim 4, wherein the tube is connected to the outlet of the upper duct.

9. The saw of claim 1, wherein the channel is lined with a plastic piece.

10. The saw of claim 9, wherein at least one of a dust collection bag and hose are connectable to the plastic piece.

11. The saw of claim 1, wherein the saw assembly is connected to a second rail slidably connected to the housing.

12. The saw of claim 11, wherein the first and second rails are connected by a connector.

13. The saw of claim 12, wherein the connector is disposed at one end of the first and second rails.

14. The saw of claim 12, wherein the connector has a main body, a first flange extending from the main body and substantially around the first rail, and a first bolt extending through the first flange and engaging the main body, creating a compression force around the first rail.

15. The saw of claim 14, wherein the connector has a second flange extending from the main body and substantially around the second rail, and a second bolt extending through the second flange and engaging the main body, creating a compression force around the second rail.

* * * * *